US010382280B2

(12) United States Patent
Iyengar et al.

(10) Patent No.: US 10,382,280 B2
(45) Date of Patent: Aug. 13, 2019

(54) ALLOCATING AND ADVERTISING AVAILABLE BANDWIDTH DUE TO SWITCHING FABRIC DEGRADATION

(71) Applicant: Juniper Networks, Inc., Sunnyvale, CA (US)

(72) Inventors: Venu Sreenivasa Iyengar, Bangalore (IN); Ravindran Thangarajah, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 331 days.

(21) Appl. No.: 15/392,696

(22) Filed: Dec. 28, 2016

(65) Prior Publication Data
US 2018/0183673 A1    Jun. 28, 2018

(51) Int. Cl.
*H04L 12/24* (2006.01)
*H04L 12/911* (2013.01)
*H04L 12/917* (2013.01)
*H04L 12/913* (2013.01)
*H04L 12/931* (2013.01)

(52) U.S. Cl.
CPC ...... *H04L 41/0896* (2013.01); *H04L 41/0654* (2013.01); *H04L 47/724* (2013.01); *H04L 47/74* (2013.01); *H04L 47/76* (2013.01); *H04L 47/783* (2013.01); *H04L 49/505* (2013.01)

(58) Field of Classification Search
CPC . H04L 41/0896; H04L 49/505; H04L 47/724; H04L 47/76; H04L 47/74; H04L 41/0654; H04L 47/783
See application file for complete search history.

(56) References Cited

U.S. PATENT DOCUMENTS

| | | | |
|---|---|---|---|
| 6,895,441 B1 * | 5/2005 | Shabtay | H04L 45/00 340/2.1 |
| 7,643,425 B2 | 1/2010 | Sakir et al. | |
| (Continued) | | | |

OTHER PUBLICATIONS

Extended European Search Report corresponding to EP 17164307.5 dated Nov. 20, 2017, 8 pages.

(Continued)

*Primary Examiner* — Walter J Divito
(74) *Attorney, Agent, or Firm* — Harrity & Harrity, LLP

(57) ABSTRACT

A network device may detect a reduced switching fabric bandwidth due to switching fabric degradation of a switching fabric. The network device may allocate the reduced switching fabric bandwidth to one or more interfaces of a packet processor. The network device may determine a first maximum reservable bandwidth for an interface of the one or more interfaces. The network device may identify a reserved bandwidth for the interface. The network device may determine an unreserved bandwidth for the interface based on the first maximum reservable bandwidth and the reserved bandwidth. The network device may advertise the unreserved bandwidth, for the interface, to a neighbor network device that communicates with the network device via the interface. The network device may provide an instruction, to the neighbor network device, for the neighbor network device to update a second maximum reservable bandwidth associated with the neighbor network device.

20 Claims, 6 Drawing Sheets

(56) References Cited

U.S. PATENT DOCUMENTS

| | | | |
|---|---|---|---|
| 8,787,400 B1* | 7/2014 | Barth | H04L 45/24 |
| | | | 370/419 |
| 8,913,490 B1 | 12/2014 | Barman et al. | |
| 2005/0180431 A1* | 8/2005 | Kinoshita | H04L 45/00 |
| | | | 370/397 |
| 2017/0104974 A1* | 4/2017 | Bak | H04N 11/28 |

OTHER PUBLICATIONS

Katz et al., "Traffic Engineering (TE) Extensions to OSPF Version 2," https://tools.ietf.org/html/rfc3630, Sep. 2003, 15 pages.

* cited by examiner

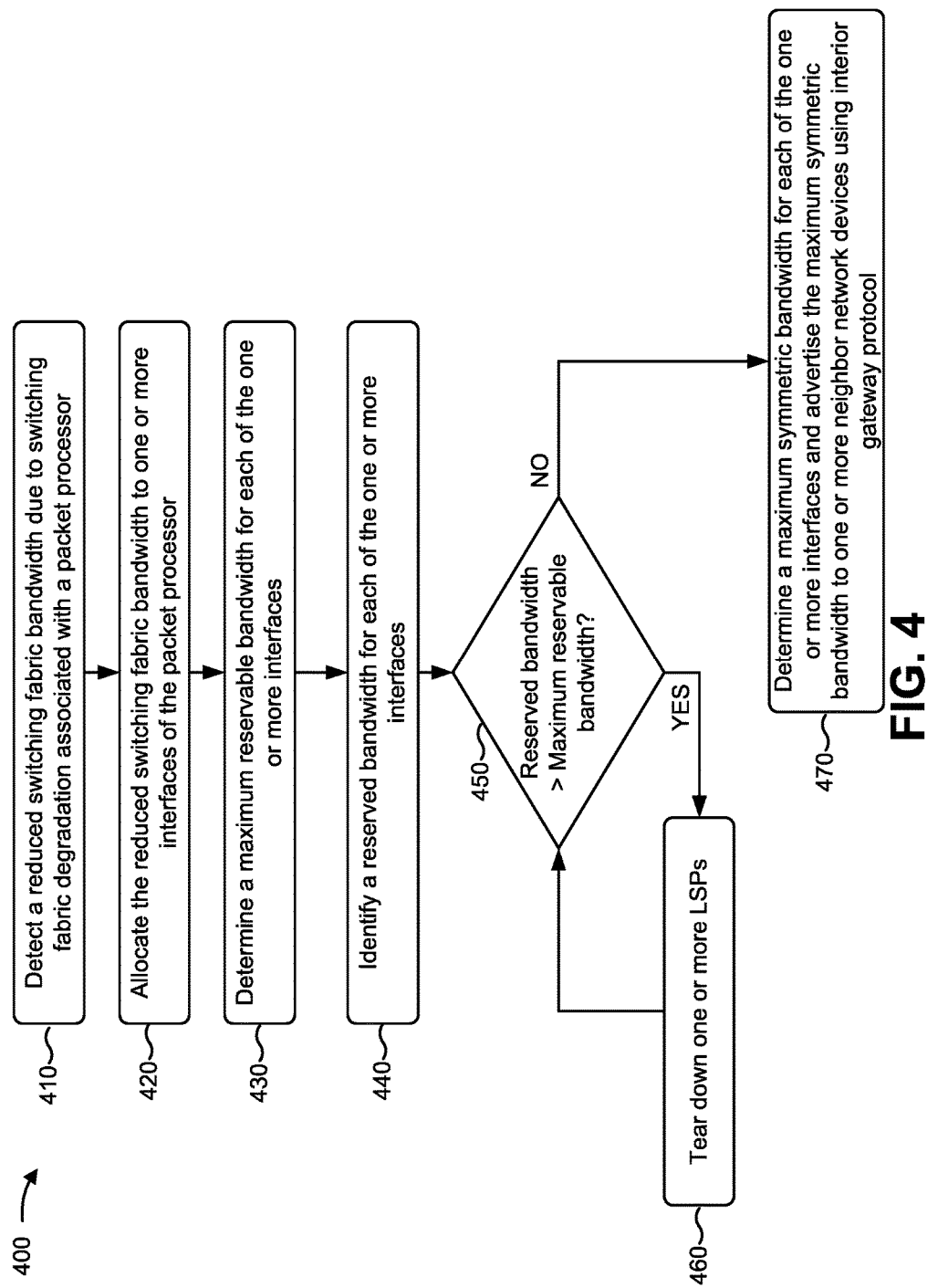

ALLOCATING AND ADVERTISING AVAILABLE BANDWIDTH DUE TO SWITCHING FABRIC DEGRADATION

BACKGROUND

A switching fabric may refer to a network topology in which different network nodes connect to each other via one or more switches, such as crossbar switches. Such a switching fabric may be implemented as a combination of hardware and software that controls traffic to and from a network node using the one or more switches.

SUMMARY

In some implementations, a network device may include a switching fabric, a packet processor connected to the switching fabric, and one or more processors to detect a reduced switching fabric bandwidth due to switching fabric degradation of the switching fabric. The one or more processors may allocate the reduced switching fabric bandwidth to one or more interfaces of the packet processor. The one or more processors may determine a first maximum reservable bandwidth for an interface of the one or more interfaces. The one or more processors may identify a reserved bandwidth for the interface. The one or more processors may determine an unreserved bandwidth for the interface based on the first maximum reservable bandwidth and the reserved bandwidth. The one or more processors may advertise the unreserved bandwidth, for the interface, to a neighbor network device that communicates with the network device via the interface. The one or more processors may provide an instruction, to the neighbor network device, for the neighbor network device to update a second maximum reservable bandwidth associated with the neighbor network device.

In some implementations, a non-transitory computer-readable medium may store one or more instructions that, when executed by one or more processors of a network device, cause the one or more processors to determine a reduced bandwidth due to switching fabric degradation associated with a packet processor of the network device. The switching fabric degradation may be due to degradation or inoperability of a path between the packet processor and a switching fabric of the network device. The one or more instructions may cause the one or more processors to allocate the reduced bandwidth among a plurality of interfaces of the packet processor. The plurality of interfaces may be used for communication between the packet processor and one or more neighbor network devices. The one or more instructions may cause the one or more processors to determine an unreserved bandwidth for an interface, of the plurality of interfaces, after allocating the reduced bandwidth among the plurality of interfaces. The one or more instructions may cause the one or more processors to advertise the unreserved bandwidth, for the interface, to a neighbor network device, of the one or more neighbor network devices, that communicates with the network device via the interface.

In some implementations, a method may include detecting, by a network device, switching fabric degradation corresponding to a switching fabric, of the network device, that is connected to a packet processor of the network device. The method may include determining, by the network device, a reduced bandwidth associated with the packet processor based on detecting the switching fabric degradation. The method may include allocating, by the network device, the reduced bandwidth among one or more interfaces of the packet processor. The one or more interfaces may be used for communication between the network device and one or more neighbor network devices. The method may include determining, by the network device, bandwidth information for an interface, of the one or more interfaces, based on allocating the reduced bandwidth among the one or more interfaces of the packet processor. The method may include advertising, by the network device, the bandwidth information to a neighbor network device, of the one or more neighbor network devices, that communicates with the network device via the interface.

BRIEF DESCRIPTION OF THE DRAWINGS

FIG. 4 is a flow chart of an example process for allocating and advertising available bandwidth due to switching fabric degradation.

DETAILED DESCRIPTION

The following detailed description of example implementations refers to the accompanying drawings. The same reference numbers in different drawings may identify the same or similar elements.

In a traffic engineered network with guaranteed bandwidth, network devices may communicate with one another to indicate an amount of bandwidth available for reservation. For example, the network devices may use a resource reservation protocol (RSVP) to reserve bandwidth across the network. Furthermore, a network device may use an interior gateway protocol (IGP) to advertise available bandwidth to neighboring network devices. In this case, the bandwidth advertised over an interface may correspond to the bandwidth capacity of the interface, and may not take into account any degradation in a switching fabric of the network device.

A switching fabric may degrade and operate at a reduced bandwidth due to, for example, hardware errors, software errors, environmental conditions (e.g., high temperature, voltage fluctuations, etc.), or the like. In this case, the network device may continue to advertise the interface bandwidth, which does not take into account the reduced bandwidth caused by degradation of the switching fabric. Thus, the network device may become over-subscribed with network traffic from network devices that receive an advertisement with the interface bandwidth, rather than the actual degraded bandwidth. This may lead to dropped network traffic at the network device, a failure to meet guaranteed bandwidth requirements, or the like.

Implementations described herein are capable of detecting switching fabric degradation and advertising available bandwidth of the network device based on the switching fabric degradation. In this way, the network device may reduce or prevent traffic loss, may satisfy guaranteed bandwidth requirements, improve network performance, or the like.

Figure 1A:
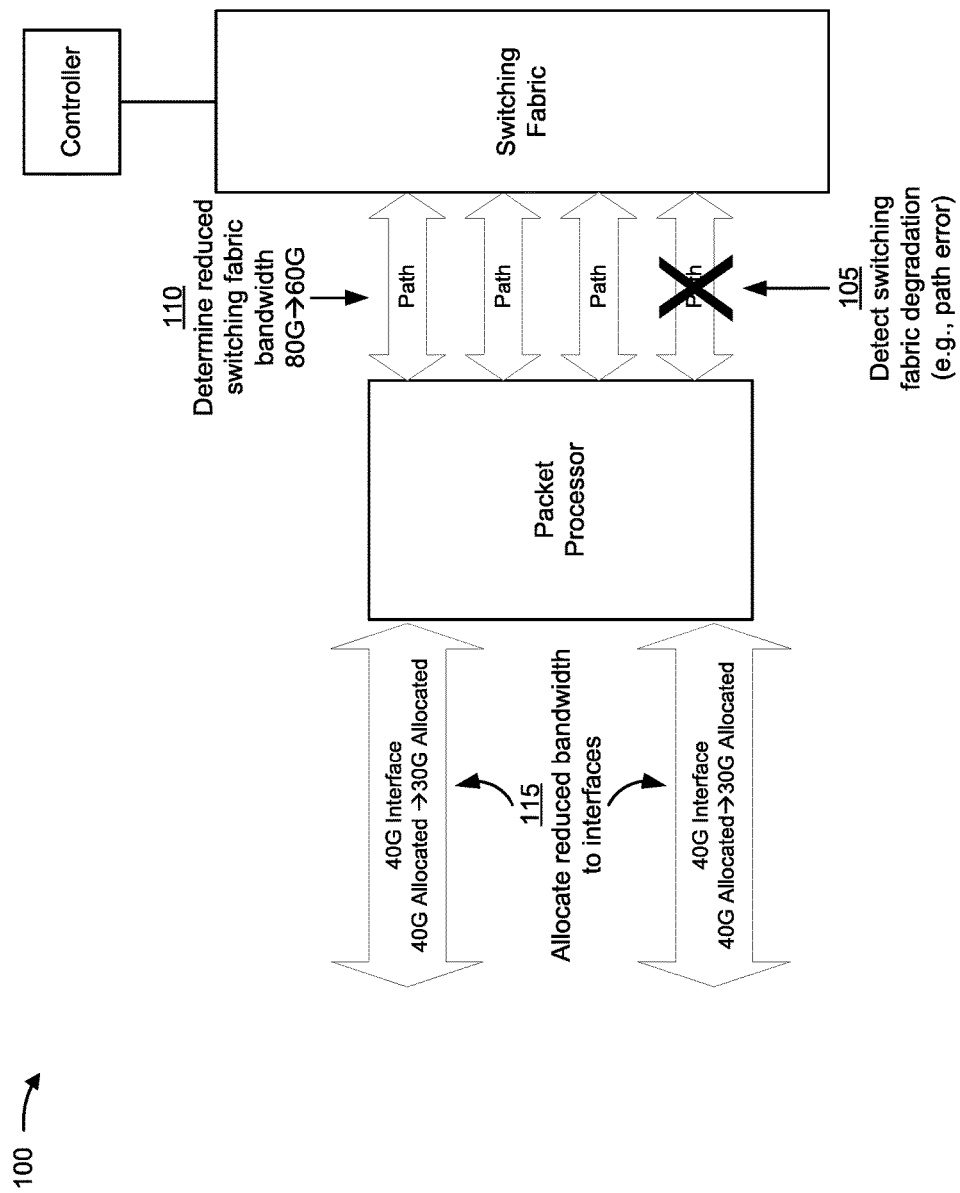
FIGS. 1A-1C are diagrams of an overview of an example implementation described herein.
Figure 1B:
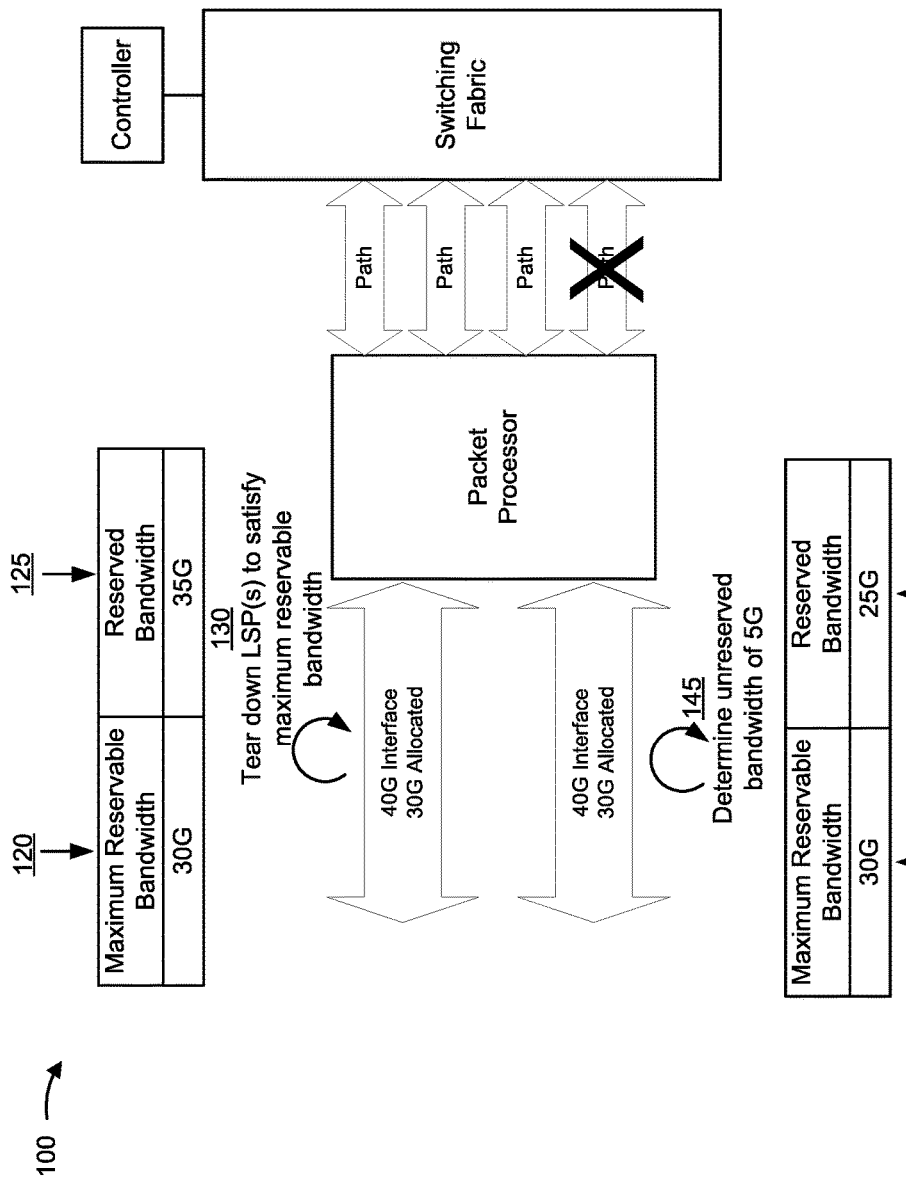
Figure 1C:
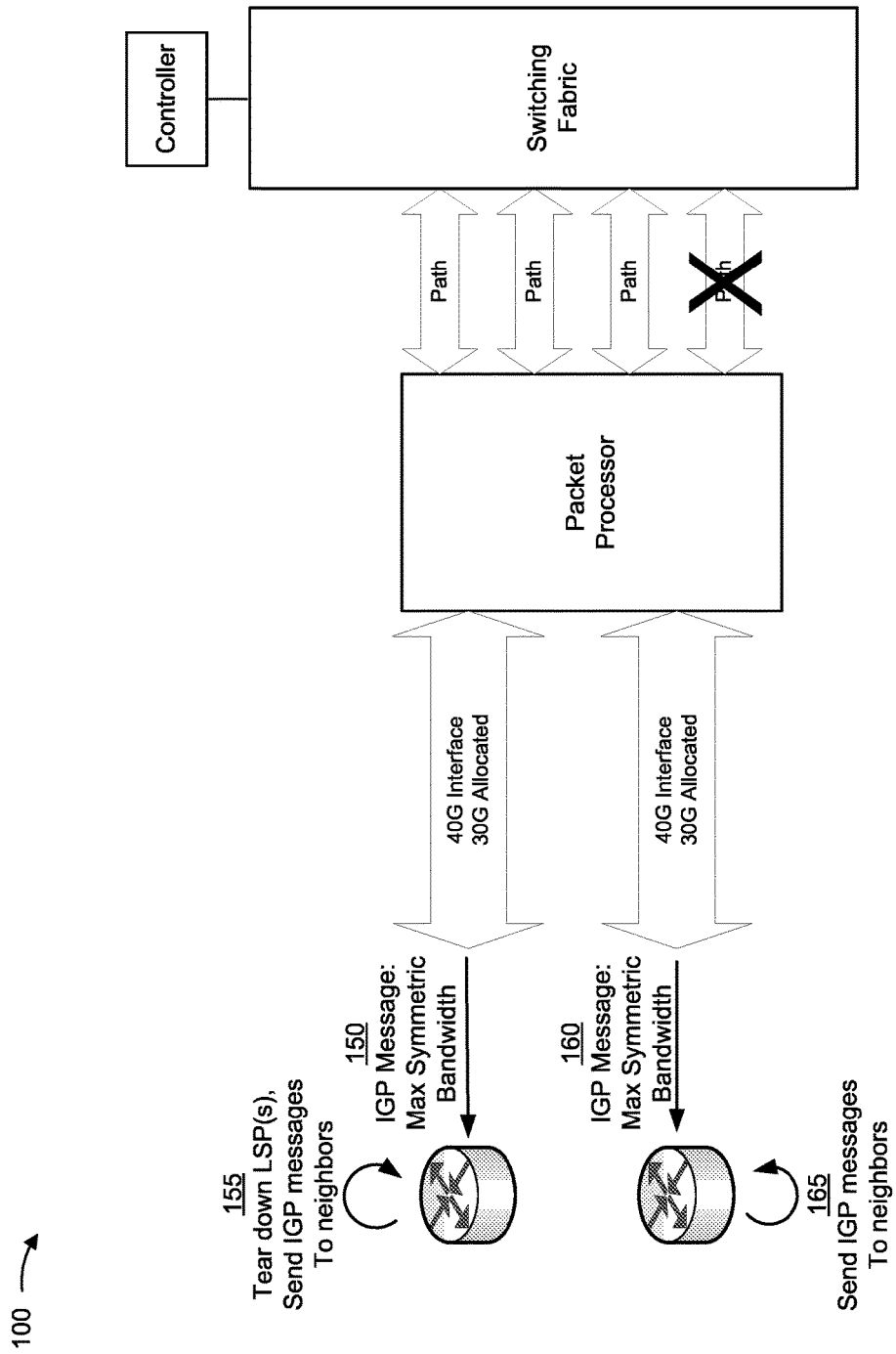

FIGS. 1A-1C are diagrams of an overview of an example implementation 100 described herein. FIG. 1A shows an example network device that includes a switching fabric with multiple paths (e.g., four paths) to and/or from a packet processor, which is connected to multiple interfaces (e.g., two interfaces). Here, the paths are each 20 gigabits per second (Gbps) paths, and the interfaces are each 40 Gbps interfaces.

As shown by reference number 105, the network device may detect switching fabric degradation, such as an error in one of the paths. As shown by reference number 110, the network device may determine a reduced switching fabric bandwidth, shown as a reduction from 80 Gbps to 60 Gbps (due to an outage in a 20 Gbps path). As shown by reference number 115, the network device may allocate the reduced bandwidth of 60 Gbps among the interfaces. For example, the network device may allocate 30 Gbps to each interface.

As shown in FIG. 1B, and by reference number 120, the network device may identify a maximum reservable bandwidth for the first interface (e.g., the 30 Gbps that were allocated to the first interface). As shown by reference number 125, the network device may identify a reserved bandwidth of 35 Gbps for the first interface, which represents an amount of bandwidth already reserved on the first interface. As shown by reference number 130, because the reserved bandwidth exceeds the maximum reservable bandwidth on the first interface, the network device tears down one or more label-switched paths (LSPs), reserved on the first interface, to satisfy the maximum reservable bandwidth.

As shown by reference number 135, on the second interface, the maximum reservable bandwidth is also the 30 Gbps that were allocated to the second interface. As shown by reference number 140, the reserved bandwidth of the second interface is 25 Gbps. In this case, because the reserved bandwidth does not exceed the maximum reservable bandwidth, the network device does not need to tear down any LSPs. As shown by reference number 145, the network device may determine an unreserved bandwidth of 5 Gbps for the second interface by subtracting the reserved bandwidth from the maximum reservable bandwidth (e.g., 30−25=5).

As shown in FIG. 1C, and by reference number 150, the network device may send an IGP message indicating bandwidth information. In some implementations, the IGP message may indicate a maximum symmetric bandwidth for a bidirectional link between network devices, and may trigger a neighbor network device to update bandwidth information. For example, the IGP message may indicate the unreserved bandwidth of 0 Gbps and a maximum reservable bandwidth of 30 Gbps on the first interface. Here, the network device may be a first network device that sends the IGP message to a second network device that is a neighbor of the first network device and that communicates with the first network device via the first interface. As shown by reference number 155, the second network device may tear down one or more LSPs based on the reduced bandwidth and/or send IGP message(s) back to the first network device and/or to other neighbors of the second network device. The IGP message(s) may indicate a reduced bandwidth on one or more interfaces of the second network device, similar to the IGP message(s) sent by the first network device.

In IGP, a single (e.g., bi-directional) physical interface between a first network device and a second network device may be represented as two unidirectional links, such as a first link from the first network device to the second network device, and a second link from the second network device to the first network device. In this case, the first network device handles IGP messaging regarding the first link, and the second network device handles IGP messaging regarding the second link. Upon detecting switching fabric degradation and allocating reduced bandwidth, the first network device may send an IGP message indicating updated bandwidth information for the first link. In some implementations, the first network device may send this IGP message to all network devices that are neighbors of the first network device. Additionally, or alternatively, the first network device may send a message to the second network device indicating that bandwidth information for the second network device needs to be updated. This message may trigger the second network device to, for example, allocate reduced bandwidth to the second link, tear down one or more LSPs on the second link, advertise updated bandwidth information for the second link, and/or the like. When advertising the updated bandwidth information, the second network device may send an IGP message to all neighbors of the second network device, including the first network device.

Similarly, as shown by reference number 160, the first network device may send an IGP message indicating a maximum symmetric bandwidth and/or the unreserved bandwidth of 5 Gbps on the second interface. Here, the first network device may send the IGP message to a third network device that is a neighbor of the first network device and that communicates with the first network device via the second interface. As shown by reference number 165, the third network device may update bandwidth information, and may send IGP message(s) back to the first network device and/or to other neighbors of the third network device. The IGP message(s) may indicate a reduced bandwidth (e.g., the allocated 30 Gbps, rather than the interface bandwidth capacity of 40 Gbps) on one or more interfaces of the third network device, similar to the IGP message(s) sent by the first network device and the second network device. In this way, dropped network traffic may be avoided or reduced by communicating accurate bandwidth information throughout the network, and this bandwidth information may be propagated throughout the network using IGP messages.

As indicated above, FIGS. 1A-1C are provided merely as an example. Other examples are possible and may differ from what was described with regard to FIGS. 1A and 1B.

Figure 2:
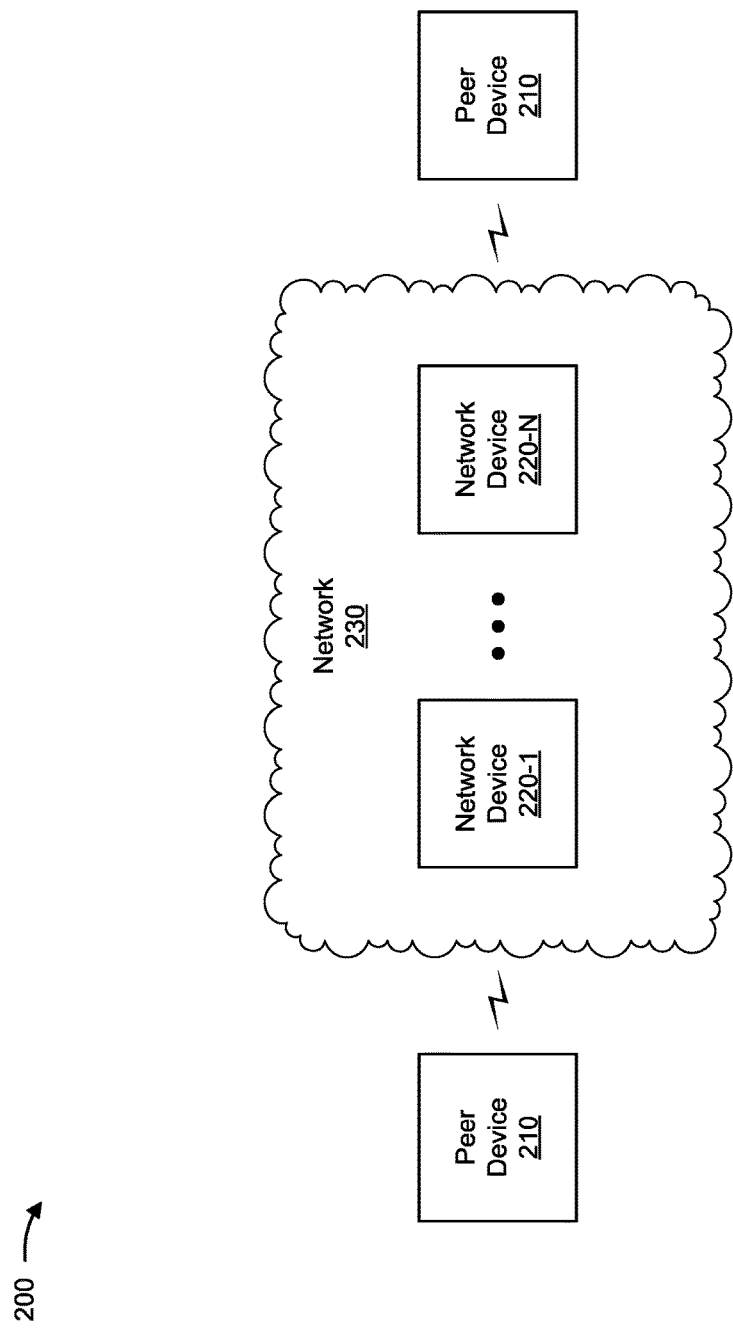
FIG. 2 is a diagram of an example environment in which systems and/or methods, described herein, may be implemented.

As shown in FIG. 2, environment 200 may include one or more peer devices 210, one or more network devices 220-1 through 220-N (N≥1) (hereinafter referred to collectively as "network devices 220", and individually as "network device 220"), and a network 230 (e.g., a traffic engineered (TE) network). Devices of environment 200 may interconnect via wired connections, wireless connections, or a combination of wired and wireless connections.

Peer device 210 includes one or more devices capable of receiving and/or providing network traffic. For example, peer device 210 may include a traffic transfer device, such as a router, a gateway, a switch, a firewall, a hub, a bridge, a reverse proxy, a server (e.g., a proxy server, a server executing a virtual machine, etc.), a security device, an intrusion detection device, a load balancer, or a similar type of device. Additionally, or alternatively, peer device 210 may include an endpoint device that is a source or a destination for network traffic. For example, peer device 210 may include a computer or a similar type of device. Peer device 210 may receive network traffic from and/or may provide network traffic to other peer devices 210 via network 230 (e.g., by routing packets using network device(s) 220 as an intermediary).

Network device 220 includes one or more devices (e.g., one or more traffic transfer devices) capable of processing, forwarding, and/or transferring traffic between peer devices (e.g., peer devices 210) and/or traffic transfer devices (e.g., other network devices 220). For example, network device 220 may include a router, such as a label switching router (LSR), a label edge router (LER), an ingress router, an egress router, a provider router (e.g., a provider edge router, a provider core router, etc.), or the like. Additionally, or alternatively, network device 220 may include a gateway, a switch, a firewall, a hub, a bridge, a reverse proxy, a server (e.g., a proxy server), a security device, an intrusion detection device, a load balancer, or any traffic transfer device. In some implementations, network device 220 may use multi-protocol label switching (MPLS) to forward packets. Additionally, or alternatively, network device 220 may reserve bandwidth using RSVP, RSVP-TE, and/or the like.

Network 230 includes one or more wired and/or wireless networks. For example, network 230 may include a traffic engineered network capable of operating with guaranteed bandwidth. For example, network 230 may include an MPLS network that uses RSVP-TE to reserve network resources (e.g., bandwidth). In this case, network devices 220 may reserve bandwidth for network traffic that flows over network 230 between network devices 220. Additionally, or alternatively, network 230 may include a cellular network (e.g., a long-term evolution (LTE) network, a code division multiple access (CDMA) network, a 3G network, a 4G network, a 5G network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
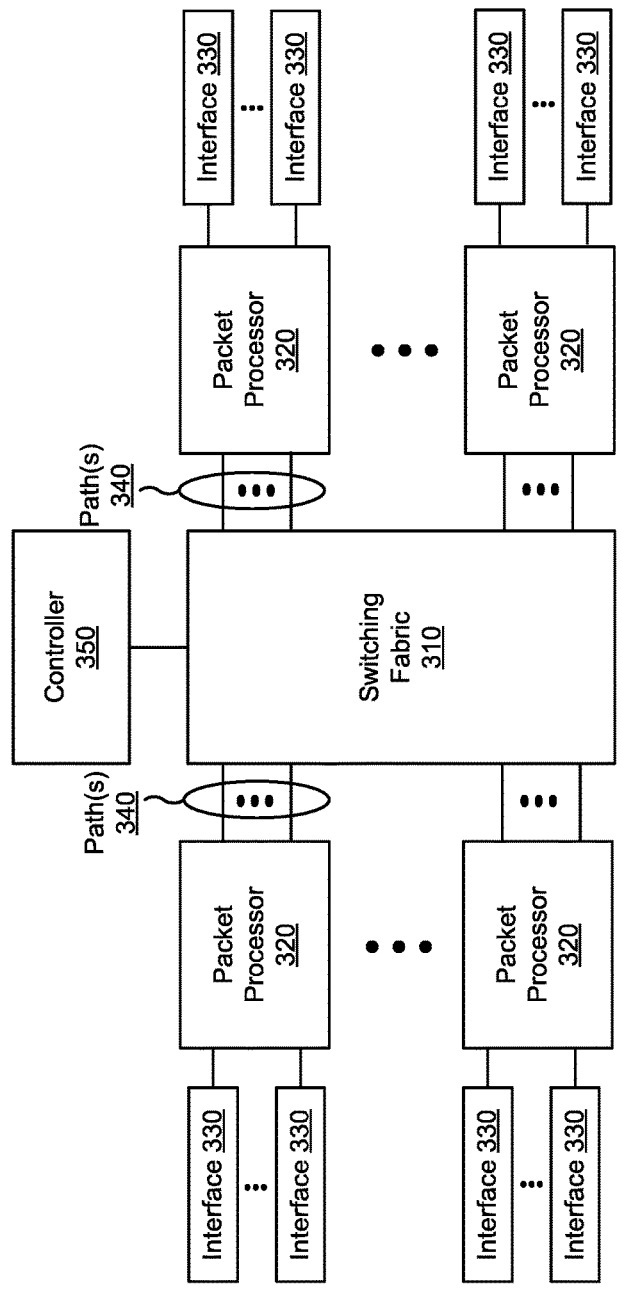
FIG. 3 is a diagram of example components of one or more devices of FIG. 2.

FIG. 3 is a diagram of example components of a device 300. Device 300 may correspond to peer device 210 and/or network device 220. In some implementations, peer device 210 and/or network device 220 may include one or more devices 300 and/or one or more components of device 300. As shown in FIG. 3, device 300 may include a switching fabric 310, one or more packet processors 320, one or more interfaces 330, one or more path(s) 340 between switching fabric 310 and packet processor 320, and a controller 350.

Switching fabric 310 interconnects interfaces 330 via packet processors 320. In some implementations, switching fabric 310 may be implemented using one or more crossbars, one or more busses, and/or one or more shared memories. In some implementations, switching fabric 310 may enable interfaces 330 and/or controller 350 to communicate. In some implementations, switching fabric 310 may connect with one or more packet processors 320. A connection between switching fabric 310 and a packet processor 320 may include one or more paths 340. In some implementations, switching fabric 310 may connect to a packet processor 320 via a single path 340. In some implementations, switching fabric 310 may connect to a packet processor 320 via multiple paths 340. Switching fabric degradation may occur when one or more of these paths 340 become inoperable, when one or more components of switching fabric 310 become inoperable, or the like.

Packet processor 320 includes one or more processing components (e.g., application-specific integrated circuits (ASICs)) to process packets. Packet processor 320 may process incoming traffic, such as by performing data link layer encapsulation or decapsulation. In some implementations, packet processor 320 may receive a packet from switching fabric 310, may process the packet, and may output the processed packet to an appropriate interface 330 connected to packet processor 320. Additionally, or alternatively, packet processor 320 may receive a packet from an interface 330, may process the packet, and may output the processed packet to switching fabric 310 for transfer to another interface 330 (e.g., via the same packet processor 320 or a different packet processor 320).

Interface 330 is a point of attachment for physical links, and may be a point of ingress and/or egress for incoming and/or outgoing traffic, such as packets. In some implementations, a single packet processor 320 may be connected to multiple interfaces 330. In some implementations, a single packet processor 320 may be connected to a single interface 330. An interface 330 may permit communication between a first network device 220 and a second network device 220 that is a neighbor of the first network device 220. Interface 330 may store packets (e.g., in a buffer) and/or may schedule packets for transmission on output physical links. Interface 330 may support data link layer encapsulation or decapsulation and/or a variety of higher-level protocols.

Path 340 is a path that permits communication between packet processor 320 and switching fabric 310. In some implementations, there may be multiple paths 340 between a single packet processor 320 and the switching fabric 310. Path 340 may include, for example, a wired or wireless path, such as a fiber-optic path, an electrical path, or the like.

Controller 350 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 350 may include one or more processors that can be programmed to perform a function.

In some implementations, controller 350 may include a random access memory (RAM), a read only memory (ROM), and/or another type of dynamic or static storage device (e.g., a flash memory, a magnetic memory, an optical memory, etc.) that stores information and/or instructions for use by controller 350.

In some implementations, controller 350 may communicate with other devices, networks, and/or systems connected to device 300 to exchange information regarding network topology. Controller 350 may create routing tables based on the network topology information, create forwarding tables based on the routing tables, and forward the forwarding tables to packet processor 320, such as for use in performing route lookups for incoming and/or outgoing packets.

Controller 350 may perform one or more processes described herein. Controller 350 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or a storage component associated with controller 350 from another computer-readable medium or from another device via a communication interface. When executed, software instructions stored in a memory and/or storage component associated with controller 350 may cause controller 350 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for allocating and advertising available bandwidth due to switching fabric degradation using interior gateway protocol. In some implementations, one or more process blocks of FIG. 4 may be performed by network device 220. For example, one or more process blocks of FIG. 4 may be performed by controller 350 (e.g., a processor of controller 350, packet processor 320, and/or the like. In some implementations, one or more process blocks of FIG. 4 may be performed by another device or a group of devices separate from or including network device 220, such as peer device 210.

As shown in FIG. 4, process 400 may include detecting a reduced switching fabric bandwidth due to switching fabric degradation associated with a packet processor (block 410). For example, network device 220 may detect a reduced switching fabric bandwidth due to degradation of switching fabric 310 associated with packet processor 320. Switching fabric degradation may be due to a path 340, between switching fabric 310 and packet processor 320, becoming degraded or inoperable. Additionally, or alternatively, switching fabric degradation may be due to degradation of switching fabric 310 (e.g., one or more crossbars, etc.), which may impact a bandwidth of one or more paths 340. For example, the switching fabric degradation may be due to a hardware error, a software error, an environmental condition (e.g. high temperature, fluctuating voltage, etc.), or the like. In some implementations, network device 220 may detect switching fabric degradation by monitoring switching fabric 310, packet processor 320, and/or path(s) 340 to determine when a path 340 experiences an error, becomes unavailable, becomes degraded to a reduced bandwidth, or the like.

Switching fabric degradation may impact switching fabric bandwidth for traffic communicated between switching fabric 310 and packet processor 320. Switching fabric bandwidth may refer to the bandwidth capable of being used to transfer traffic between switching fabric 310 and packet processor 320 (e.g., via path(s) 340). When network device 220 is in a degraded state due to switching fabric degradation, interface(s) 330 of packet processor 320 may be capable of handling a higher bandwidth than path(s) 340 of packet processor 320, but the traffic may be dropped by packet processor 320 because there is not enough bandwidth to handle the traffic on the path(s) 340 between packet processor 320 and switching fabric 310.

In some cases, network device 220 may use IGP to advertise an interface bandwidth (e.g., the maximum bandwidth supported by an interface 330) to neighbor network devices 220. When switching fabric 310 is degraded, however, the switching fabric bandwidth for packet processor 320 may be less than an aggregate interface bandwidth advertised for the interfaces 330 connected to and/or hosted on packet processor 320. In such a case, network device 220 may advertise interface bandwidths to neighbor network devices 220 (e.g., using IGP) even though the switching fabric bandwidth is less than the aggregate interface bandwidth (e.g., an aggregate bandwidth capacity on all interfaces 330 of the packet processor 320), which may result in network device 220 being over-subscribed. For example, network device 220 may receive more traffic than network device 220 is capable of processing because network device 220 has advertised a higher bandwidth than network device 220 is capable of processing (e.g., due to the reduced switching fabric bandwidth as a result of switching fabric degradation). As a result, network device 220 may drop traffic and may be unable to meet guaranteed bandwidth requirements.

As described below, network device 220 may advertise bandwidth determined based on the switching fabric degradation, thereby accurately advertising available bandwidth to neighbor network devices 220. In this way, network device 220 may reduce traffic drops and enable network device 220 to meet guaranteed bandwidth requirements, thereby improving network performance and resiliency.

As further shown in FIG. 4, process 400 may include allocating the reduced switching fabric bandwidth to one or more interfaces of the packet processor (block 420). In some implementations, network device 220 may determine a reduced switching fabric bandwidth by storing information that identifies a bandwidth associated with each path 340 between switching fabric 310 and packet processor 320. When a path 340 and/or a component of switching fabric 310 (e.g., a crossbar) becomes degraded and/or inoperable, network device 220 may use this stored information to calculate the reduced switching fabric bandwidth, and may allocate this reduced bandwidth to the interface(s) 330 of packet processor 320 impacted by the degraded or inoperable path 340.

For example, assume that there are four paths 340 between switching fabric 310 and packet processor 320, and that each path 340 is capable of handling 20 Gbps. Here, the total switching fabric bandwidth is 80 Gbps during normal operation. However, if network device 220 detects an error, such as inoperability in one of the paths 340, then network device 220 may calculate the reduced switching fabric bandwidth by subtracting the bandwidth associated with the inoperable path 340 from the total switching fabric bandwidth. In this case, the reduced switching fabric bandwidth would be 60 Gbps (80 Gbps−20 Gbps=60 Gbps). Additionally, or alternatively, network device 220 may monitor throughput on the path(s) to determine the reduced switching fabric bandwidth.

Network device 220 may allocate the reduced switching fabric bandwidth among interfaces 330 of packet processor 320. In some implementations, network device 220 may allocate the reduced switching fabric bandwidth equally. Continuing with the above example, if there are two interfaces 330 of packet processor 320, then network device 220 may allocate 30 Gbps (e.g., of the 60 Gbps reduced bandwidth) to each interface 330. Similarly, if there are three interfaces 330 of packet processor 320, network device 220 may allocate 20 Gbps to each interface 330.

In some implementations, network device 220 may allocate the reduced switching fabric bandwidth proportionally. In this case, if a first interface 330 is capable of handling more traffic than a second interface 330, then network device 220 may allocate more bandwidth to the first interface 330 than the second interface 330. Continuing with the above example, if the first interface 330 has a capacity of 60 Gbps and the second interface 330 has a capacity of 20 Gbps, then after a switching fabric degradation, network device 220 may allocate 45 Gbps to the first interface 330 and 15 Gbps to the second interface 330.

In some implementations, network device 220 may allocate the reduced switching fabric bandwidth in another manner. For example, if a first interface 330 is a high priority interface, and a second interface 330 is a low priority interface, and both interfaces 330 are capable of handling 40 Gbps, network device 220 may allocate the maximum bandwidth of 40 Gbps to the first interface 330, and may allocate the remaining 20 Gbps to the second interface 330. Additionally, or alternatively, network device 220 may allocate the reduced switching fabric bandwidth based on reserved bandwidth(s) on the interface(s) 330. Additionally, or alternatively, network device 220 may allocate the reduced switching fabric bandwidth based on a combination of the techniques described above (e.g., by applying a model and/or algorithm that applies different weights to the techniques) to reduce or minimize an impact on network operation.

As further shown in FIG. 4, process 400 may include determining a maximum reservable bandwidth for each of the one or more interfaces (block 430). The maximum reservable bandwidth for an interface 330 may refer to an amount of bandwidth that interface 330 is capable of handling after switching fabric degradation. In some implementations, network device 220 may determine the maximum reservable bandwidth for an interface 330 to be equal to the bandwidth allocated to the interface 330 by the network device 220 after switching fabric degradation, as described above. In some implementations, network device 220 may determine the maximum reservable bandwidth for each interface 330 of the packet processor 320 impacted by the switching fabric degradation.

As further shown in FIG. 4, process 400 may include identifying a reserved bandwidth for each of the one or more interfaces (block 440). The reserved bandwidth for an interface 330 may refer to the bandwidth that has already been reserved on that interface 330. In some implementations, network device 220 may determine a reserved bandwidth for an interface 330 to be equal to the sum of the bandwidths for all label-switched paths (LSPs) currently allocated to the interface 330. In some implementations, network device 220 may store information regarding an amount of bandwidth that has been reserved on the interface 330. Additionally, or alternatively, network device 220 may store information regarding an amount of bandwidth that has been reserved for different LSPs, and/or may store information regarding which LSPs are assigned to the interface 330. In some implementations, network device 220 may determine the reserved bandwidth for each interface 330 of the packet processor 320 impacted by the switching fabric degradation.

As further shown in FIG. 4, process 400 may include determining whether the reserved bandwidth exceeds the maximum reservable bandwidth (block 450). For example, network device 220 may compare the reserved bandwidth and the maximum reservable bandwidth for an interface 330 to determine whether the reserved bandwidth exceeds the maximum reservable bandwidth for that interface 330. In some implementations, network device 220 may compare the reserved bandwidth and the maximum reservable bandwidth for each interface 330 of the packet processor 320 impacted by the switching fabric degradation.

As further shown in FIG. 4, if the reserved bandwidth exceeds the maximum reservable bandwidth (block 450—YES), then process 400 may include tearing down one or more LSPs (block 460). For example, network device 220 may tear down one or more LSPs of an interface 330 if network device 220 determines that the reserved bandwidth on the interface 330 exceeds the maximum reservable bandwidth for the interface 330.

In some implementations, if the reserved bandwidth is greater than the maximum reservable bandwidth for an interface 330, then network device 220 may take action to reduce the reserved bandwidth on the interface 330 until the reserved bandwidth is less than or equal to the maximum reservable bandwidth. For example, network device 220 may tear down one or more LSPs to cause the reserved bandwidth on the interface 330 to be less than or equal to the maximum reservable bandwidth of the interface 330.

In some implementations, network device 220 may tear down the one or more LSPs, on interface 330, based on LSP priority. For example, network device 220 may tear down low priority LSPs first, while maintaining high priority LSPs. Additionally, or alternatively, network device 220 may successively tear down LSPs, on an interface 330, in an order from lowest priority to highest priority until the reserved bandwidth on the interface 330 is less than or equal to the maximum reservable bandwidth of the interface 330.

In some implementations, network device 220 may tear down the one or more LSPs of an interface 330 based on comparing corresponding bandwidths of the LSPs. In some implementations, network device 220 may tear down fewer LSPs with higher reserved bandwidth (e.g., to conserve resources associated with tearing down an LSP). In some implementations, network device 220 may tear down more LSPs with lower reserved bandwidth (e.g., to prevent traffic disruptions associated with tearing down a high bandwidth LSP). Additionally, or alternatively, network device 220 may allocate the reduced switching fabric bandwidth based on a combination of the techniques described above (e.g., by applying a model and/or algorithm that applies different weights to the techniques) to reduce or minimize the impact on network operation.

In some implementations, network device 220 may provide an indication, to neighbor network devices 220, that one or more LSPs have been torn down, and/or may identify the LSP(s) that have been town down. In this way, the neighbor device 220 may take a corresponding action, and the network 230 may be reconfigured and traffic may be handled appropriately. In some implementations, network device 220 may tear down LSPs for each interface 330 on which the reserved bandwidth exceeds the maximum reservable bandwidth.

As further shown in FIG. 4, if the reserved bandwidth does not exceed the maximum reservable bandwidth (block 450—NO), then process 400 may include determining a maximum symmetric bandwidth for each of the one or more interfaces and advertising the maximum symmetric bandwidth to one or more neighbor network devices using interior gateway protocol (block 470). For example, if network device 220 determines that the reserved bandwidth does not exceed the maximum reservable bandwidth (e.g., because one or more interfaces 330 were operating at less than full capacity and/or or because one or more LSPs were torn down to reduce the reserved bandwidth), then network device 220 may determine an unreserved bandwidth for each of the one or more interfaces 330 impacted by the switching fabric degradation. Network device 220 may advertise the unreserved bandwidth to one or more neighbor network devices 220 using an IGP message. In some implementations, the IGP message may include an indication that the unreserved bandwidth is a symmetric unreserved bandwidth, which may cause neighbor network device(s) 220 to update bandwidth information and send corresponding IGP messages in a similar manner.

In some implementations, network device 220 may determine unreserved bandwidth based on the reserved bandwidth and the maximum reservable bandwidth (e.g., by subtracting the reserved bandwidth from the maximum reservable bandwidth). In some implementations, network device 220 may re-allocate unreserved bandwidth for a first interface 330 to a second interface 330.

In some cases, when network device 220 tears down one or more LSPs on an interface 330, the resulting reserved bandwidth on the interface 330 may be less than the maximum reservable bandwidth on the interface 330. In this case, network device 220 may advertise the unreserved bandwidth to one or more neighbor network devices 220.

In some implementations, network device 220 may advertise the unreserved bandwidth to one or more neighbor network devices 220. For example, network device 220 may advertise unreserved bandwidth for an interface 330 via the interface 330 (e.g., to a neighbor network device 220 that communicates with network device 220 via the interface). Additionally, or alternatively, network device 220 may advertise a maximum reservable bandwidth for the interface 330. Additionally, or alternatively, the first network device 220 may send an IGP message to all neighbor network devices of the first network device 220 (e.g., via interface(s) on which IGP is enabled). This IGP message may be sent regardless of whether these neighbor network devices 220 currently communicate with the first network device 220 via the impacted interfaces, and may be used to set up future LSPs.

In some implementations, network device 220 may use IGP to advertise bandwidth information. For example, network device 220 may include a bandwidth value in a field (e.g., a type, length, value (TLV) field, a sub-TLV field, a sub-TLV of a Link TLV field, etc.) of an IGP message (e.g., a link-state advertisement (LSA) message). The value may indicate bandwidth information, such as an unreserved bandwidth, a maximum reservable bandwidth, a maximum symmetric bandwidth (e.g., a maximum bandwidth that applies to both link directions between network devices 220), and/or the like.

In some implementations, network device 220 may include bandwidth information in an LSA message so that the bandwidth information is received by all network devices 220 in network 230 (e.g., is flooded throughout the network). In this way, the bandwidth information may be used to intelligently control bandwidth allocation and bandwidth guarantees throughout the network 230 (e.g., for global traffic engineering).

As an example, a first network device 220 may use an IGP message to advertise bandwidth information (e.g., unreserved bandwidth, maximum reservable bandwidth, maximum symmetric bandwidth, and/or the like) to a second network device 220 in the link direction from the first network device 220 to the second network device 220. The second network device 220 may be a neighbor of the first network device 220 that communicates with the first network device 220 via an interface. In some implementations, the bandwidth information may indicate a maximum symmetric bandwidth for the interface 330, which may cause the second network device 220 to update a maximum reservable bandwidth for one or more interfaces 330 of the second network device 220. The maximum symmetric bandwidth may be included in an LSA message, as described above, in a way that does not impact network devices 220 that are unable to interpret the maximum symmetric bandwidth.

For example, the bandwidth information (e.g., a maximum symmetric bandwidth) may indicate that the bandwidth reduction is bi-directional (e.g., applies in both directions of a bi-directional link that includes interface 330), which may cause the second network device 220 to allocate and/or compute reduced bandwidth for interfaces of second network device 220 (e.g., in a similar manner as described above in connection with blocks 410-460), and to advertise bandwidth information to neighbors of the second network device 220 that communicate with the second network device 220 via one or more impacted interfaces (e.g., the first network device 220). For example, the second network device 220 may use an IGP message to advertise bandwidth information, of an interface of the second network device 220, to the first network device 220 in the link direction from the second network device 220 to the first network device 220. This ensures bi-directional bandwidth reduction using IGP. Additionally, or alternatively, the second network device 220 may send an IGP message to all neighbor network devices of the second network device 220 (e.g., via interface(s) on which IGP is enabled). This IGP message may be sent regardless of whether these neighbor network devices 220 currently communicate with the second network device 220 via the impacted interfaces, and may be used to set up future LSPs.

The first network device 220 and/or the second network device 220 may continue to allocate and/or update bandwidth based on IGP messages (e.g., as described above), and may advertise updated bandwidth information to neighbor network devices 220 until the updates have been propagated throughout the network 230. In this way, network devices 220 may reduce traffic drops throughout network 230 and may enable guaranteed bandwidth requirements to be met.

While implementations are described herein in connection with a packet processor 320 impacted by switching fabric degradation, in some cases, multiple packet processors 320 may be impacted by switching fabric degradation. In this case, network device 220 may perform process 400 for each packet processor 320 impacted by the switching fabric degradation, in a similar manner as described above.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein are capable of detecting switching fabric degradation and advertising available bandwidth of the network device based on the switching fabric degradation. In this way, the network device may reduce or prevent traffic loss, may satisfy guaranteed bandwidth requirements, may improve network performance, or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network device, comprising:
a switching fabric;
a packet processor connected to the switching fabric; and
one or more processors to:
  detect a reduced switching fabric bandwidth due to switching fabric degradation of the switching fabric;
  allocate the reduced switching fabric bandwidth to one or more interfaces of the packet processor;
  determine a first maximum reservable bandwidth for an interface of the one or more interfaces;
  identify a reserved bandwidth for the interface;
  determine an unreserved bandwidth for the interface based on the first maximum reservable bandwidth and the reserved bandwidth;
  advertise the unreserved bandwidth, for the interface, to a neighbor network device that communicates with the network device via the interface; and
  provide an instruction, to the neighbor network device, for the neighbor network device to update a second maximum reservable bandwidth associated with the neighbor network device.

2. The network device of claim 1, where the one or more processors, when providing the instruction, are further to:
  provide the instruction using interior gateway protocol.

3. The network device of claim 1, where the one or more processors are further to:
  advertise the first maximum reservable bandwidth, for the interface, to the neighbor network device.

4. The network device of claim 1, where the one or more processors are further to:
  determine that the reserved bandwidth does not exceed the first maximum reservable bandwidth; and
  where the one or more processors, when determining the unreserved bandwidth, are to:
    determine the unreserved bandwidth by subtracting the reserved bandwidth from the first maximum reservable bandwidth based on determining that the reserved bandwidth does not exceed the first maximum reservable bandwidth.

5. The network device of claim 1, where the one or more processors are further to:
  determine that the reserved bandwidth exceeds the first maximum reservable bandwidth;
  tear down one or more label-switched paths, reserved on the interface, to cause the reserved bandwidth not to exceed the first maximum reservable bandwidth based on determining that the reserved bandwidth exceeds the first maximum reservable bandwidth; and
  where the one or more processors, when determining the unreserved bandwidth, are to:
    determine the unreserved bandwidth by subtracting the reserved bandwidth from the first maximum reservable bandwidth after tearing down the one or more label-switched paths.

6. The network device of claim 1, where the switching fabric degradation is due to degradation or inoperability of a path between the packet processor and the switching fabric of the network device.

7. The network device of claim 1, where the reduced switching fabric bandwidth is less than an aggregate bandwidth capacity of the one or more interfaces of the packet processor.

8. A non-transitory computer-readable medium storing instructions, the instructions comprising:
  one or more instructions that, when executed by one or more processors of a network device, cause the one or more processors to:
    determine a reduced bandwidth due to switching fabric degradation associated with a packet processor of the network device,
      the switching fabric degradation being due to degradation or inoperability of a path between the packet processor and a switching fabric of the network device;
    allocate the reduced bandwidth among a plurality of interfaces of the packet processor,
      the plurality of interfaces being used for communication between the packet processor and one or more neighbor network devices;
    determine an unreserved bandwidth for an interface, of the plurality of interfaces, after allocating the reduced bandwidth among the plurality of interfaces; and
    advertise the unreserved bandwidth, for the interface, to a neighbor network device, of the one or more neighbor network devices, that communicates with the network device via the interface.

9. The non-transitory computer-readable medium of claim 8, where the one or more instructions, when executed by the one or more processors, further cause the one or more processors to:

determine a maximum reservable bandwidth, for the interface, that represents an amount of bandwidth allocated to the interface after the switching fabric degradation; and advertise the maximum reservable bandwidth, for the interface, to the neighbor network device.

10. The non-transitory computer-readable medium of claim 8, where the one or more instructions, when executed by the one or more processors, further cause the one or more processors to:

determine a maximum reservable bandwidth, for the interface, that represents an amount of bandwidth allocated to the interface after the switching fabric degradation;

determine a reserved bandwidth, for the interface, based on information associated with one or more label-switched paths reserved on the interface; and where the one or more instructions, that cause the one or more processors to determine the unreserved bandwidth for the interface, cause the one or more processors to:

determine the unreserved bandwidth based on the maximum reservable bandwidth and the reserved bandwidth.

11. The non-transitory computer-readable medium of claim 10, where the one or more instructions, that cause the one or more processors to determine the reserved bandwidth, cause the one or more processors to:

determine the reserved bandwidth after tearing down at least one label-switch path of the one or more label-switched paths.

12. The non-transitory computer-readable medium of claim 8, where the reduced bandwidth is less than an aggregate bandwidth capacity of the plurality of interfaces of the packet processor.

13. The non-transitory computer-readable medium of claim 8, where the one or more instructions, that cause the one or more processors to advertise the unreserved bandwidth, cause the one or more processors to:

advertise the unreserved bandwidth using a link-state advertisement message of an interior gateway protocol.

14. The non-transitory computer-readable medium of claim 8, where the one or more instructions, that cause the one or more processors to advertise the unreserved bandwidth, cause the one or more processors to:

advertise a maximum symmetric bandwidth that applies to both directions of a bi-directional link between the network device and the neighbor network device, the bi-directional link being associated with the interface.

15. A method, comprising:

detecting, by a network device, switching fabric degradation corresponding to a switching fabric, of the network device, that is connected to a packet processor of the network device;

determining, by the network device, a reduced bandwidth associated with the packet processor based on detecting the switching fabric degradation;

allocating, by the network device, the reduced bandwidth among one or more interfaces of the packet processor, the one or more interfaces being used for communication between the network device and one or more neighbor network devices;

determining, by the network device, bandwidth information for an interface, of the one or more interfaces, based on allocating the reduced bandwidth among the one or more interfaces of the packet processor, where determining the bandwidth information comprises:

determining an unreserved bandwidth based on a maximum reservable bandwidth for the interface and a reserved bandwidth for the interface, the bandwidth information including information that identifies the unreserved bandwidth; and advertising, by the network device, the bandwidth information to a neighbor network device, of the one or more neighbor network devices, that communicates with the network device via the interface.

16. The method of claim 15, where:

the unreserved bandwidth represents an amount of available bandwidth on the interface after the switching fabric degradation, the maximum reservable bandwidth represents an amount of bandwidth allocated to the interface after the switching fabric degradation, and where the bandwidth information includes a maximum symmetric bandwidth associated with the interface, that applies to both directions of a bi-directional link, that is associated with the interface, between the network device and the neighbor network device.

17. The method of claim 15, further comprising:

determining the maximum reservable bandwidth, for the interface, that represents an amount of bandwidth allocated to the interface after the switching fabric degradation; and determining the reserved bandwidth for the interface.

18. The method of claim 17, where determining the reserved bandwidth comprises:

determining the reserved bandwidth after tearing down one or more label-switched paths reserved on the interface.

19. The method of claim 15, where advertising the bandwidth information comprises:

advertising the bandwidth information in one or more type, length, value fields of a link-state advertisement message of an interior gateway protocol.

20. The method of claim 19, where advertising the bandwidth information comprises:

advertising a maximum symmetric bandwidth that applies to both directions of a bi-directional link between the network device and the neighbor network device, the bi-directional link being associated with the interface.

* * * * *